United States Patent [19]

Jonasson

[11] Patent Number: 4,687,677
[45] Date of Patent: Aug. 18, 1987

[54] METHOD AND A DEVICE FOR LINING PIPELINES BY MEANS OF A FLEXIBLE HOSE CONTAINING A CURABLE PLASTIC

[75] Inventor: Vollmar Jonasson, Lycksele, Sweden
[73] Assignee: V-J System AB, Vilhelmina, Sweden
[21] Appl. No.: 683,279
[22] PCT Filed: Apr. 6, 1984
[86] PCT No.: PCT/SE84/00126
§ 371 Date: Dec. 6, 1984
§ 102(e) Date: Dec. 6, 1984
[87] PCT Pub. No.: WO84/03928
PCT Pub. Date: Oct. 11, 1984

[30] Foreign Application Priority Data
Apr. 6, 1983 [SE] Sweden .................. 8301890

[51] Int. Cl.$^4$ .................. B05D 3/02; B05D 3/06; B32B 31/00; B05C 11/00
[52] U.S. Cl. .................. 427/8; 118/642; 118/643; 118/712; 156/272.2; 156/378; 156/380.9; 427/45.1; 427/54.1; 427/55; 427/238
[58] Field of Search .................. 427/45.1, 46, 54.1, 427/95, 230, 239, 238, 8; 156/272.2, 287, 294, 380.9, 378; 118/642, 643, 712

[56] References Cited

U.S. PATENT DOCUMENTS

| 3,804,663 | 4/1974 | Clarke | 427/55 X |
| 4,135,958 | 1/1979 | Wood | 118/56 X |
| 4,581,247 | 4/1986 | Wood | 427/53.1 |

FOREIGN PATENT DOCUMENTS 2350976 4/1974 Fed. Rep. of Germany .
2018384 10/1979 United Kingdom .

Primary Examiner—Michael R. Lusignan
Attorney, Agent, or Firm—Burns, Doane, Swecker & Mathis

[57] ABSTRACT

A method and a device for lining existing pipelines such as water conduits and sewers disposed in the ground with a flexible hose containing a curable plastic material which hose is introduced into the pipeline to be lined in uncured state and is then made stable in form by curing of the curable plastic material included in the hose. To make possible a rapid and efficient curing of the plastic material included in the hose (4) the hose (4), after being pressed out against the pipeline (1) by means of compressed air, is exposed to radiation energy from a curing aggregate (18) containing a radiation source (19), which aggregate is drawn internally through the hose (4) at the same time as air flows through said hose.

15 Claims, 5 Drawing Figures

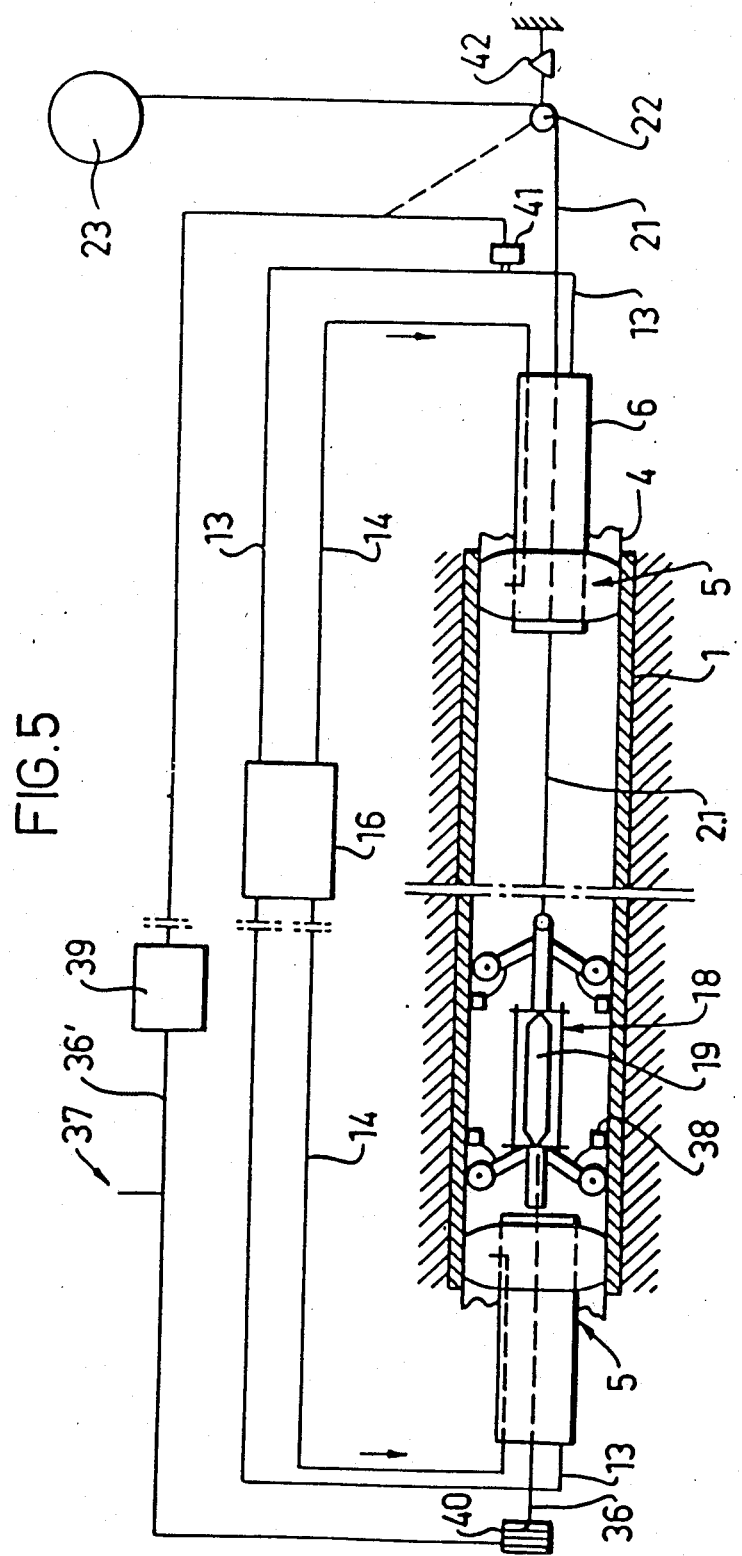

METHOD AND A DEVICE FOR LINING PIPELINES BY MEANS OF A FLEXIBLE HOSE CONTAINING A CURABLE PLASTIC

BACKGROUND AND SUMMARY OF THE INVENTION

This invention relates to a method for lining existing pipelines such as water conduits and sewers disposed in the ground with a flexible hose containing a curable plastic material which is introduced in its uncured state into the conduit to be lined and is then made stable in form by curing of the curable plastic material included in the hose.

For repair of pipelines broken or damaged in another way and/or weakened by corrosion dug down into the ground, e.g. water conduits and sewers, it has previously been necessary to dig up the damaged portion of the pipeline to be able to repair the line by replacing the damaged portion by a new piece of pipe. As this procedure is uncomfortable, time-consuming, requires much equipment and is costly, attempts have been made for ten years or so to create simpler and more efficient methods for repair of existing pipelines disposed in the ground which methods do not require digging or another external uncovering of the pipeline or the portion thereof that must be repaired. Thus, at present there are various restoration methods such as cement injection which, however, are best suited for naturally sloping conduits with occasional big places of leakage but the condition of which is otherwise good, panel lining and installation of a new conduit in the existing conduit, which latter methods, however, involve a substantial reduction of the conduit area and are therefore only suitable for big conduits, the capacity of which is not fully utilized.

However, these known restoration methods can only be used to a limited extent, and therefore attempts have also been made to develop a restoration method, the principle of which is soaking a terylene felt shaped to a pipe with a polyester compound and then introducing this as a laminate in uncured state into the pipeline to be restored by means of a pressure medium such as water or air. When the laminate has been positioned within the pipeline hot water or hot air is pumped in under pressure to cure the polyester in the laminate while the laminate is kept expanded against the surrounding pipeline so that the laminate forms a tight inner surface layer within the pipeline after curing. This type of restoration method has been found to have certain advantages but despite a development work of several years one has not been successful in mastering the problem of the very curing of the laminate which has turned out to be very troublesome, not least considering the cooling influence, especially in winter-time, that the surrounding pipeline and the masses of earth around the latter as well as in-flowing cold ground water or surface water has on the plastic during its curing. With the curing method used so far, i.e. with hot water or hot air which is circulated through the laminate applied within an existing pipeline it has also appeared to be very difficult to achieve a satisfactory curing along the whole pipeline and to check the curing process as well as the result thereof. The curing process will also take a relatively long time due to the constant cooling to which the hot water or hot air is exposed and, moreover, requires much energy.

It is therefore the object of this invention to provide a method of lining pipelines with a flexible curable plastic comprising a sock or hose which has not the above-mentioned shortcomings and deficiencies but makes possible a rapid and efficient curing of the plastic in the sock with a relatively slight consumption of energy. Moreover, it is the object of this invention to achieve a device for carrying out the method.

BRIEF DESCRIPTION OF THE DRAWINGS

The invention is described more in detail in the following with reference to the enclosed drawings, in which

FIG. 4 shows schematically a section through a curing aggregate in a position before being drawn into the pressed out hose and FIG. 5 shows schematically the curing aggregate as drawn into the hose and during curing.

DETAILED DESCRIPTION OF THE PREFERRED EMBODIMENTS

Figure 1:
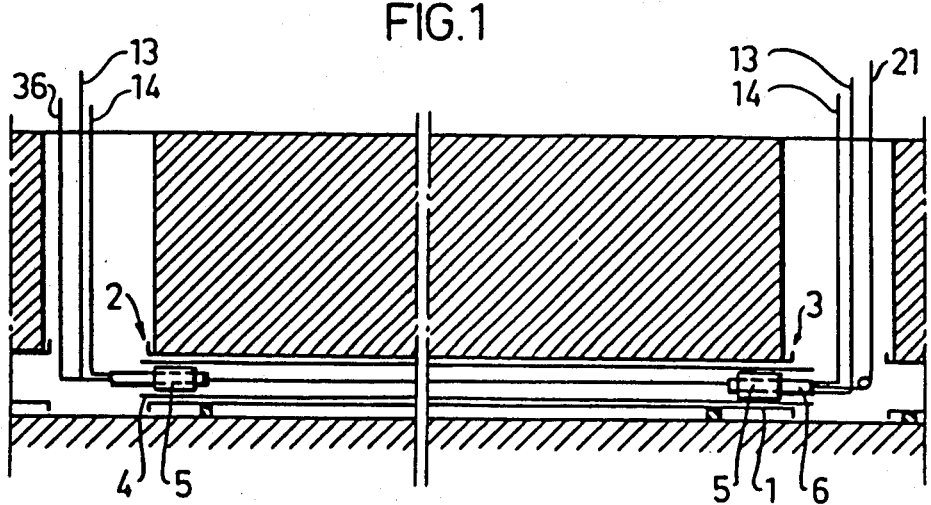
FIGS. 1 and 2 show schematically a longitudinal section through a pipeline placed in the ground and with applied sock or hose and terminal means in a pressed out or not pressed out state.
Figure 3:
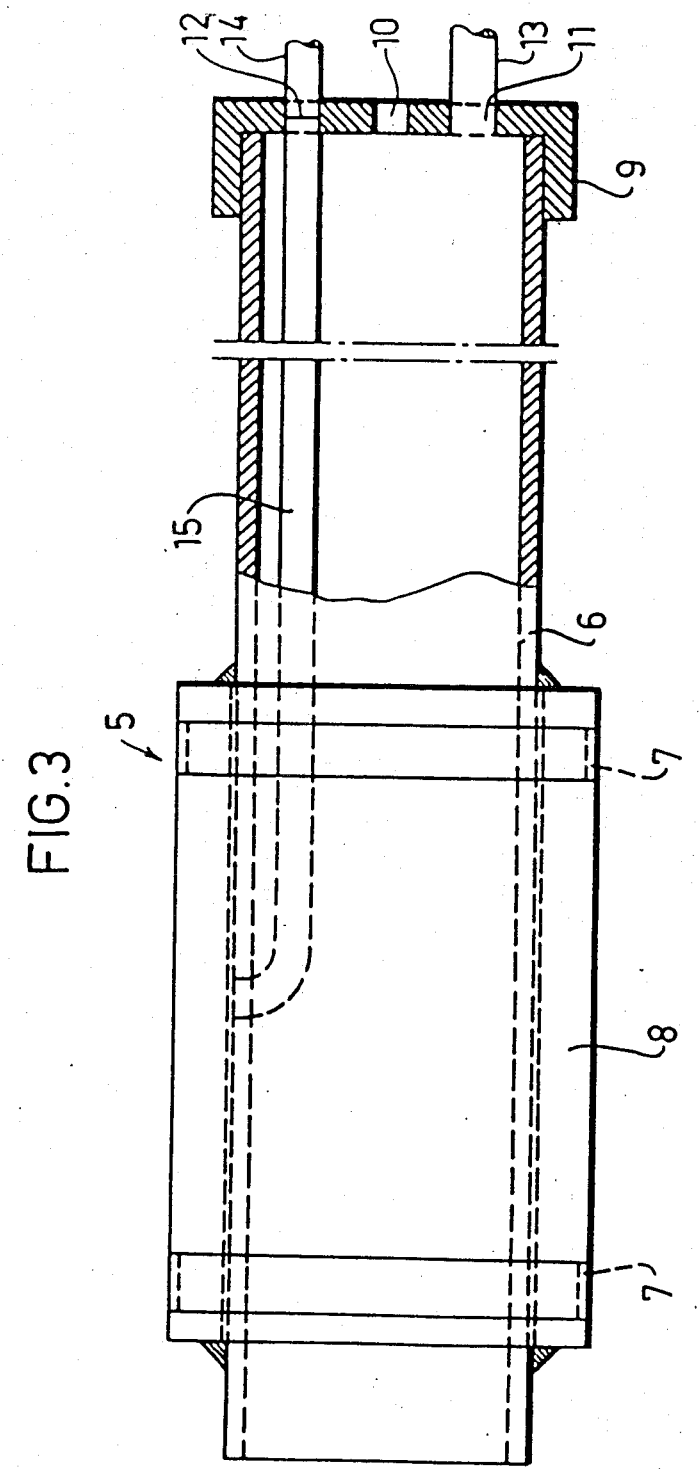
FIG. 3 shows on a larger scale a terminal means partly in section.

On the drawings 1 designates a pipeline placed in the ground which is to be lined between its uncovered ends 2 and 3 with a flexible sock or hose 4 comprising a curable plastic, which is applied in its uncured state within the pipeline 1. In FIG. 1 the hose 4 is shown in its uncured state as drawn into the pipeline 1 and provided with terminal means 5 at its ends. Each of these terminal means consists of a rigid pipe 6 (FIG. 3) with an external rubber bladder 8 attached by means of clips 7 which bladder can be blown up by means of compressed air for attaching and sealing the hose 4 against the pipeline 1. The pipe 6 of each terminal means is sealed at its end facing away from the bladder 8 by a terminal sleeve 9 or the like having a centrally located passage 10 and with two connections 11 and 12 for compressed air lines 13, 14 for air to and from the hose 4 for pressing it out against the pipeline 1 before curing and for keeping the hose in pressed-out position during curing and for compressed air to the rubber bladder 8 via a conduit 15 arranged within the pipe 6. The conduit 13 for compressed air which like the compressed air line 14 is connected to a source 16 for compressed air (FIG. 5) connects the two terminal means 5 with each other and forms together with the hose 4 a circulation line for the air.

Figure 2:
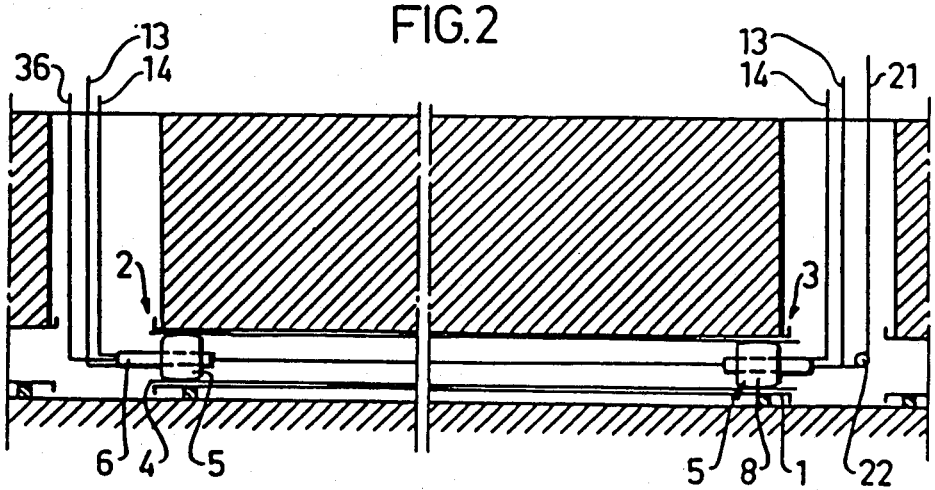

Moreover, in the position shown in FIG. 2 for start of curing of the plastic in the hose expanded against the pipeline 1 by means of compressed air a curing aggregate 18 is arranged within a pipe 6 of one terminal means. This aggregate 18 (FIG. 4) comprises a radiation source 19 and a carriage 20 supporting this which is connected with a pull rope 21 extending through the centrally located passage 10 of the other terminal means. This pull rope is connected to a drive motor 22 and is arranged to be wound onto a driven drum 23 placed after the drive motor 22.

The carriage 20 of the curing aggregate in the embodiment shown on the drawings only as an example comprises a front portion 24 and a rear portion 25, between which the radiation source 19 is arranged. More specifically this is attached with its ends in end shields 26 included in the respective portion 24, 25, which shields are reciprocally fixed by means of at least two, preferably three of four bars 27 with threaded end portions and locking nuts 28 or the like placed on each side of the relative shield 26. By this arrangement a replacement of radiation source is made possible in a simple manner and as the distance between the shields 26 is adjustable radiation sources of different length can be arranged in the carriage 20.

Figure 4:
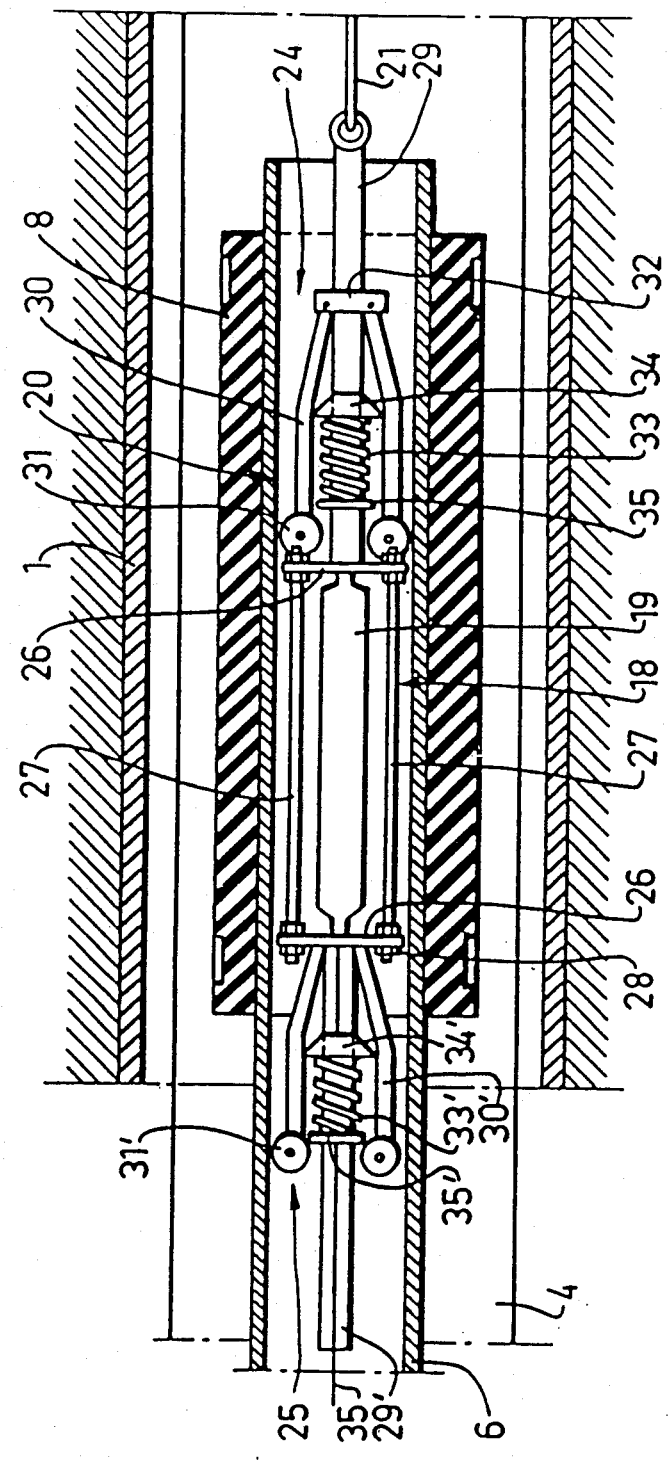

The front portion 24 of the carriage comprises a draw bar 29 connected to the end shield 26, the pull rope 21 being attached to said draw bar, and at least two, preferably three or four angularly disposed legs 30, each provided with a wheel 31, preferably of double type and pivotally mounted on a holder 32 attached to the draw bar 29. In FIG. 4 the legs 30 are let in against the draw bar 29 and are under the influence of a spring force tending to swing out the legs 30 but prevented from this by the pipe 6 in the position shown in FIG. 4, but as soon as the legs 30 with their wheels 31 leave the pipe 6 of the terminal means they are swung out to bear on the hose 4 expanded against the pipeline 1 and are then maintained in contact with this and the pipeline 1 with a reduced spring force so that the legs 30 when they possibly meet irregularities of another obstacle, are allowed to spring inwardly without too great a resistance. In the embodiment shown on the drawings this spring force is created by a spring 33 disposed around the draw bar which spring bears against a support 35 fixed on the bar with one end and bears with its other end on or is connected to a preferably tapered pressure ring or sleeve 34 slideably arranged on the draw bar 29 and held by the tightened spring in contact with all the legs 30 in order to swing out these at the same time when they are released from the pipe 6.

The rear portion 25 of the carriage is built and operates in the same way as its front portion 24, and therefore it need not be more closely described but its parts have been given the same reference numerals as the corresponding parts of the front portion, however with the addition of a '-indication. However, in the embodiment shown on the drawings there is the difference that the legs 30' of the rear portion are pivotally mounted to the shield 26 and that the hollow rod 29' of the rear portion operates as a casing of a multi-conductor cable 36 for current supply to the radiation source 19 from a current source 37 (FIG. 5), for grounding thereof and for transport of control signals from temperature sensors 38 placed at one or more of the legs 30, 30' of the front and rear parts or at other suitable places, which sensors are arranged to sense the temperature at the inside of the hose in the curing process, to a control unit 39. The multiconductor cable 36 extends from the carriage through the central passage 10 of the terminal means and further to said current source 37 and to said control unit 49 with its signal conducting portion 36' with an excessive length corresponding to the lining length, which excessive length can be wound onto a drum 40 of winch type which offers little resistance to uncoiling and from which the cable may run into the central passage of the terminal means via a control pipe tapered towards this, which pipe is not shown more in detail on the drawings for the sake of clearness.

Even if it is not shown on the drawings the legs 30, 30' of the front and rear portions can be individually actuated by each their spring arranged between the bar 29, 29' and the respective legs 30, 30', which has the effect that each leg will be individually resilient and can adjust itself according to possible irregularities within the pipeline independtly of the other legs. However the legs 30, 30' are arranged their aim is always to keep the radiation source 19 centered in the pipeline 1 when the carriage is being drawn through it for curing the curable plastic in the hose so that the latter is made stable in form.

The radiation source 10 included in the curing aggregate consists of an infra-red lamp, a UV-lamp, ir-heater or the like depending on which type of plastic is used in the hose which is to be made stable in form by curing of the included plastic.

After the hose 4 has been introduced into the pipeline 1 to be lined, the terminal means have been positioned and the other equipment has been connected in the intended way the compressed air is turned on for pressing out the hose against the inside of the pipeline and for expansion of the rubber bladders 8 of the terminal means for fixing and sealing the hose ends against the pipeline 1. It should be mentioned here that the hose 4 should be applied in the pipeline with an excess at its ends, as it contracts a little when being pressed against the pipeline and this applies above all to the type of hose described in Swedish laid-open print No. 7701289-6 and which is to be preferred to other hoses or socks for this purpose existing on the market due to its armouring permitting the hose to expand and consequently connect itself to the pipeline and giving the hose in its cured state a substantially higher strength than what has been found possible to achieve with other hose types occurring on the market for the purpose in question.

When the hose 4 is thus pressed out against the pipeline 1 as well as the rubber bladders 8 of the terminal means the drive motor 22 is started for drawing in the curing aggregate 18 into the hose from the pipe 6 of the terminal means. As soon as the pipe 6 releases the legs 30 of the front portion these are swung out by the spring 33 and, similarly, the legs 30' of the rear portion are swung when they are released by the pipe 6. After this the legs 30, 30' keep the radiation source 19 centered within the pipeline 1. When the radiation source 19 has left the pipe 6 of the terminal means completely or partly it is connected and then gives off the necessary energy in the intended form for curing of the plastic while it is being drawn in its carriage 20 by the drive motor 22 through the hose 4 which is then retained in position, is pressed out against the pipeline 1 by circulating compressed air which can have a substantially lower pressure than what is used for pressing out the hose 4 from the state shown in FIG. 1 to the state shown in FIG. 2. Air is then also used as cooling medium to maintain the temperature at the inside of the hose within the temperature limits stipulated for the used plastic. The temperature at the inside of the hose is sensed continuously by the temperature sensors 38 and as soon as the temperature has a tendency to rise above a predetermined highest value or sink below a predetermined minimum value this is registered by the temperature sensors 38 which then provide a control signal via the control unit 39 to an adjusting valve 41 arranged in the conduit 13 for compressed air which, thereby, increases and reduces, respectively, the air flow through the hose 4. In this way the temperature is always maintained within the permitted values. It is also possible, within the scope of the invention, to control the drive motor 22 in dependence of the temperature prevailing at the inner periphery of the hose so that the velocity, at which the curing aggregate is driven, increases when the temperature rises, and is reduced when the temperature sinks, respectively, and this can and should take place in combination with the described adjustment of the air flow through the hose 4.

When the curing aggregate 18 has passed through the hose 4 and curing thereof is finished the radiation source 19 is disconnected and the curing aggregate is drawn into the pipe 6 of the terminal means which is made possible thanks to the existing inclination of the legs 30, 30'. Should the tractive force required during the propelling of the curing aggregate through the hose increase above what is normal this is registered by a load sensing means 42 which is shown schematically as connected to the motor 22 and which breaks the current to the radiation source 19 if said tractive force exceeds a predetermined maximum value, which is also the result if the tractive force disappears completely, e.g. at a rupture of the pull rope 21, in order to prevent damage to the plastic through overheating.

The present invention is not restricted to what has been described above and shown on the drawings but can be changed and modified in several different manner within the scope of the inventive thought set forth in the claims.

What is claimed is:

1. A method for lining existing pipelines, such as water conduits and sewers positioned in the ground with a flexible hose having a curable plastic material, including introducing the hose into the pipeline to be lined in an uncured state and stabilizing the material in place by curing the curable plastic material, comprising introducing a curing aggregate into the hose and curing the plastic material subsequent to pressing the hose against the pipeline by means of compressed air, exposing the hose to radiation energy from the curing aggregrate containing a radiation source while drawing the aggregrate internally through the hose, simultaneously flowing air through said hose, monitoring temperature of the air flow and adjusting flow of the air dependent on the monitored temperature.

2. The method of claim 1, wherein the flow of air is adjusted in dependence of the temperature prevailing at the inner periphery of the hose so that this temperature is prevented by the air used as cooling medium from increasing above a predetermined highest value and sink below a predetermined minimum value.

3. The method of claim 1, wherein the velocity at which the curing aggregate is propelled through the hose is adjusted depending upon the temperature prevailing at the inner periphery of the hose.

4. The method of claim 1, wherein the tractive force required for driving the curing aggregate through the hose is controlled by a load sensing means for disconnection of the radiation source of the curing aggregate when the tractive force increases above a predetermined value and when the tractive force sinks below such a value.

5. The method of claim 1, wherein the radiation source consists of an infra-red lamp, a UV lamp or ir-heater.

6. A device for lining existing pipelines, such as water conduits and sewers positioned in the ground, with a flexible hose having a curable plastic material, the hose being introduced into the pipeline to be lined when the hose is in an uncured state and is then stabilized in place by curing the plastic material, wherein a curing aggregate is provided with a radiation source arranged to be drawn through the hose subsequent to said hose being expanded within the surrounding pipeline, said expansion obtained by means of compressed air, the radiation energy source included in the curing aggregate to expose the hose to radiation energy, means for circulating air through the hose at the same time as the curing aggregate is drawn through the hose, means for monitoring temperature of the circulating air, and means for adjusting flow of the circulating air dependent on the monitored temperature.

7. The method of claim 2, wherein the velocity at which the curing aggregate is propelled through the hose is adjusted depending upon the temperature prevailing at the inner periphery of the hose.

8. The method of claim 2, wherein the tractive force required for driving the curing aggregate through the hose is controlled by a load sensing means for disconnection of the radiation source of the curing aggregate when the tractive force increases above a predetermined value and when the tractive force sinks below such a value.

9. The method of claim 3, wherein the tractive force required for driving the curing aggregate through the hose is controlled by a load sensing means for disconnection of the radiation source of the curing aggregate when the tractive force increases above a predetermined value and when the tractive force sinks below such a value.

10. The method of claim 2, wherein the radiation source consists of an infra-red lamp, a UV lamp or ir-heater.

11. The method of claim 3, wherein the radiation source consists of an infra-red lamp, a UV lamp or ir-heater.

12. The method of claim 4, characterized in that the radiation source (19) consists of an infrared lamp, a UV-lamp or ir-heater.

13. The method of claim 7, characterized in that the radiation source (19) consists of an infrared lamp, a UV-lamp or ir-heater.

14. The method of claim 8, characterized in that the radiation source (19) consists of an infrared lamp, a UV-lamp or ir-heater.

15. The method of claim 9, characterized in that the radiation source (19) consists of an infrared lamp, a UV-lamp or ir-heater.

* * * * *